A. J. COMER.
EYEGLASS HOLDER.
APPLICATION FILED NOV. 15, 1915.
1,238,496. Patented Aug. 28, 1917.
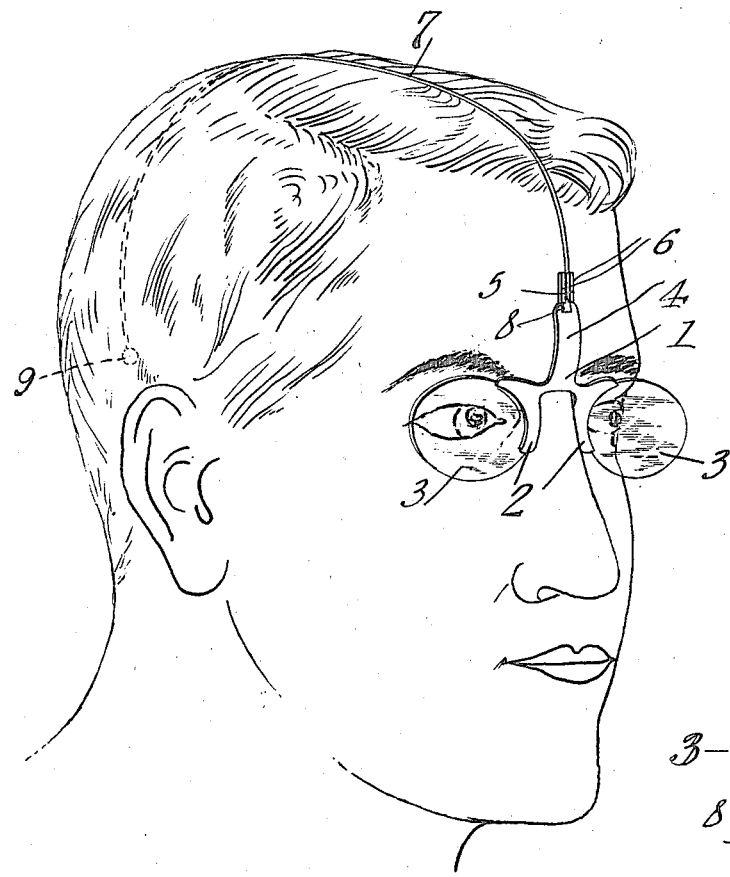
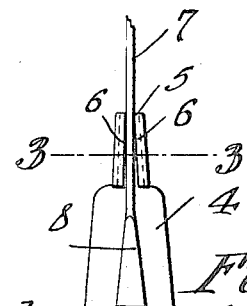
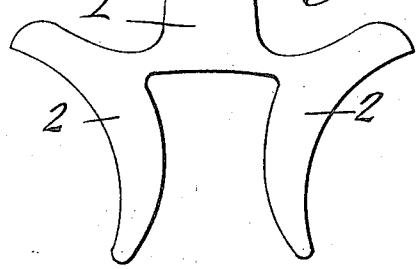
Witnesses
A. J. Comer  Inventor
Attorneys

UNITED STATES PATENT OFFICE.

ANDREW J. COMER, OF CULLISON, KANSAS.

EYEGLASS-HOLDER.

1,238,496.   Specification of Letters Patent.   Patented Aug. 28, 1917.

Application filed November 15, 1915. Serial No. 61,643.

*To all whom it may concern:*

Be it known that I, ANDREW J. COMER, a citizen of the United States, residing at Cullison, in the county of Pratt and State of Kansas, have invented a new and useful Eyeglass-Holder, of which the following is a specification.

The present invention appertains to eye glasses or spectacles, and aims to provide a novel and improved means for holding a pair of eye glasses or lenses in place upon the head of the wearer without the discomfort usually incident to spectacles having hooks engaging behind the ears, or eye glasses having nose pieces which grip or clamp the nose.

The present holder embodies a nose piece or bridge which comfortably fits the nose without creating any objectionable pressure thereon, in connection with a spring adapted to fit over the crown of the head for holding the nose piece in place in a most comfortable and satisfactory manner.

The invention aims to provide an eye glass holder of the nature indicated which is extremely simple and inexpensive both in construction and manufacture, and which is thoroughly practical and efficient in use, the holder being applicable to various heads since the spring can be sprung to fit any size or shape of head.

Another object of the invention is the provision of a holder having the characteristics above noted which can be readily applied to and removed from the head, and which can be carried compactly within a suitable case or receptacle, the spring being detachably connected with the nose piece in a peculiar manner whereby the spring can be readily detached from and attached to the nose piece, and the spring being adapted to be coiled up when detached so as to be readily placed within the case or receptacle.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is a perspective view of a holder as in use.

Fig. 2 is an enlarged front view of the nose piece or bridge and front end of the spring with the parts in position to be removed or detached.

Fig. 3 is an enlarged sectional detail taken on the line 3—3 of Fig. 2.

Fig. 4 is a detail illustrating the rear end of the spring.

In carrying out the invention, there is provided a nose piece or bridge 1 constructed of sheet metal or other suitable material, and provided with opposite crescent-shaped or arcuate portions 2 to which the eye glasses or lenses 3 can be cemented or otherwise attached. The portions 2 are adapted to loosely straddle the nose without creating any pressure thereagainst, and if desired, the portions 2 can entirely encircle the eye glasses, it being possible to make the nose piece in various styles, as will be apparent.

The nose piece or bridge 1 has an upwardly projecting relatively wide tongue 4 to rest comfortably against the forehead, for holding the nose piece or bridge above the nose in a comfortable manner, and the upper terminal 5 of the tongue 4 is provided with reflexed or bent back lips 6 providing an upwardly tapered socket with a slot between the lips 6. This socket is used for the attachment of the forward end of the spring 7 to the nose piece.

The spring 7 is preferably fashioned from resilient wire or other suitable material, and is curved or bowed to pass over the crown of the head with its forward end in front of the forehead, and with its rear end bearing against the rear of the head for holding the nose piece in place. The forward end of the spring 7 has a tapered flattened portion 8 which is movable upwardly into the tapered socket between and under the lips 6. Thus, by placing the spring 7 between the lips 6 as indicated in Fig. 2, and then pulling the spring 7 upwardly, the tapered portion 8 will be drawn tightly between and under the lips 6 so as to bind therein. This rigidly connects the forward end of the spring with the nose piece. The rear end of the spring 7 is provided with a ball or knob 9 to thereby avoid a sharp point so that the rear end of the spring can bear against the head without discomfort.

The spring 7 can be readily placed over the head, the rear end of the spring passing into the hair and bearing against the back of the head, to hold the nose piece comfortably in place. This avoids the strain or pressure upon the ears due to the ear engaging hooks of certain spectacles and also eliminates the pinching or gripping pressure upon the nose incident to those eye glasses which have nose pieces gripping the nose by spring pressure. The spring can be bent to fit any head, and when the holder is taken off of the head, the spring can be readily detached from the nose piece, by forcing the spring 7 to the position illustrated in Fig. 2, whereby the spring 7 can be removed from between the lips 6. The spring can be coiled up within a small compass and placed within a case or receptacle with the nose piece and glasses.

Having thus described the invention, what is claimed as new is:

1. An eyeglass holder comprising a sheet metal bridge plate having opposite crescent shaped eye glass attaching portions to straddle the nose, said plate having a relatively wide upwardly projecting tongue curved to rest comfortably against the lower forehead, and a spring to pass over the head and having its forward end attached rigidly to the free end of said tongue to hold it against the forehead.

2. An eye glass holder comprising a sheet metal bridge plate having opposite portions to straddle the nose and for the attachment of eye glasses, said plate having a relatively wide upwardly projecting tongue curved to rest comfortably against the lower forehead, said tongue having at its upper end an upwardly tapered socket and a forward vertical slot, and a wire spring to pass over the head having a tapered portion at its forward end to fit upwardly in said tapered socket, the spring being adapted to be passed through said slot.

In testimony that I claim the foregoing as my own, I have hereto affixed my signature in the presence of two witnesses.

ANDREW J. COMER.

Witnesses:
L. M. HUTCHISON,
ROY L. MILLER.

Copies of this patent may be obtained for five cents each, by addressing the "Commissioner of Patents, Washington, D. C."